D. A. HOPKINS.

JOURNAL BEARING.

No. 10,426. Reissued Dec. 18, 1883.

Witnesses.
Robert Everett.
J. A. Rutherford

Inventor.
David A. Hopkins.
By James L. Norris.
Atty.

N. PETERS, Photo-Lithographer, Washington, D. C.

UNITED STATES PATENT OFFICE.

DAVID A. HOPKINS, OF PARK RIDGE, NEW JERSEY.

JOURNAL-BEARING.

SPECIFICATION forming part of Reissued Letters Patent No. 10,426, dated December 18, 1883.

Original No. 286,927, dated October 16, 1883. Application for reissue filed November 22, 1883.

*To all whom it may concern:*

Be it known that I, DAVID A. HOPKINS, a citizen of the United States, residing at Park Ridge, in the county of Bergen and State of New Jersey, have invented certain new and useful Improvements in Journal-Bearings, of which the following is a full, clear, and exact specification.

My invention relates to an improvement in journal-bearings, its object being to so construct a journal-bearing as to cause the journal side to become quickly self-fitting to the journal when in use and subjected to load-pressure, aided by the rotation of the journal, the same being effected by the yielding of the soft metal or material presented on the journal side of the bearing, the pressure exerted on the bearing when in use, combined with the rotation of the journal, causing the soft metal superimposed or arranged on and secured to the unyielding portion of the bearing not only to yield and spread, but to automatically adjust itself and partake of the contour of the journal.

To this end my said invention consists in constructing a journal-bearing of two different metals, one of said metals being of a soft or yielding character and the other of a hard or unyielding nature, the one possessing the soft or yielding nature presenting ridges or spurs on the journal side of the bearing, which receive the initial pressure of the journal, and by the rolling action or rotation of the same and the load-pressure upon the bearing become crushed down, spread, or displaced to the varying extent required at different points along its length, to shape the surface of the soft-metal ridges as needed to insure their conformity with the contour of the journal, the result being that the surfaces of the soft-metal ridges in contact with the journal become automatically and quickly adjusted thereto by the yielding of said ridges, rather than by their being worn to a fit. Between the ridges or spurs should be placed any suitable lubricant of a quality or character sufficiently stiff to retain itself in position between the ridges or spurs when in its normal condition, but which will be converted into a fluid when subjected to a moderate heat.

Figure 1:
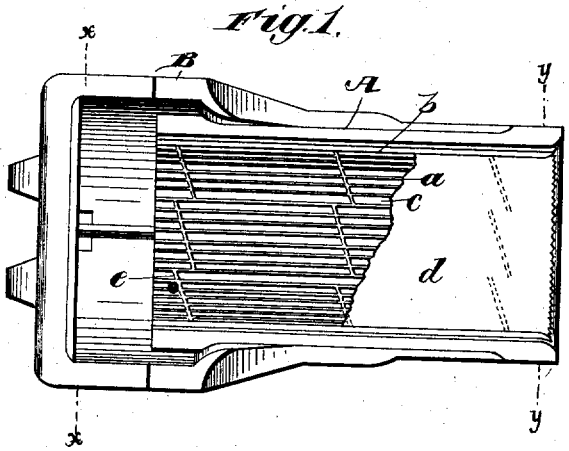
Figure 2:
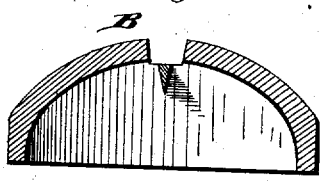
Figure 4:
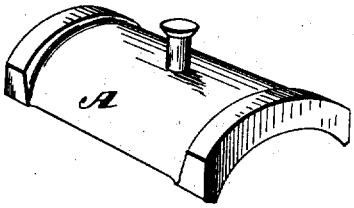
Figure 5:
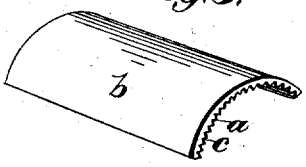
Figure 3:
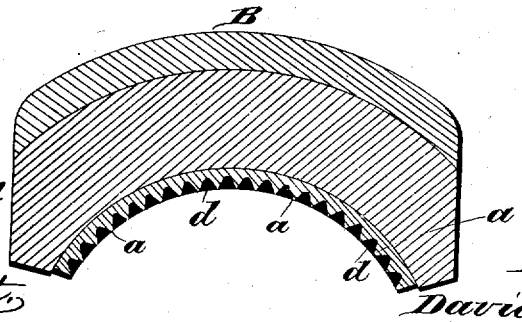

Referring to the accompanying drawings, Figure 1 represents a top or plan view of a journal-bearing, showing my invention applied thereto. Fig. 2 is a transverse section of the casing, taken on the line *x x* of Fig. 1. Fig. 3 is an enlarged transverse section of Fig. 1, taken on the line *y y*, showing the manner of applying soft or yielding metal ridges or spurs upon the hard body or unyielding portion of the journal-bearing. Fig. 4 is a perspective view of the body or unyielding portion of a journal-bearing detached from its iron casing. Fig. 5 is a perspective view, as an entirety, of the ridges or spurs made of soft or yielding metal and detached from the hard body or unyielding portion of the journal-bearing.

In the drawings, A represents a journal-bearing of any suitable or desirable construction, made of a metal or an alloy of metals possessing a hard or unyielding nature—such as brass—upon the journal side of which is arranged or fixed a series of ridges or spurs, *a a*, composed of soft or yielding metal—such as Babbitt metal, or such as is usually employed in lining journal-boxes—for lessening friction and reducing the cost of manufacture of the bearing complete. These ridges or spurs are shown as preferably formed by me with a backing, *b*, for connection by solder or otherwise with the hard or unyielding metal portion of the journal-bearing, as shown in Figs. 3 and 5 of the drawings, which is a very convenient and practical mode of applying the invention. By so constructing the ridges or spurs and adapting the same to the journal side of the unyielding body or portion of the journal-bearings, a series of spaces or grooves, *c*, will intervene between the ridges or spurs, which form receptacles for a lubricant, *d*. The lubricant employed should be plastic, like tallow, when mixed with black-lead, or sufficiently stiff to retain itself in position when placed between the ridges or spurs when the journal-bearing is not in use. The soft-metal or yielding ridges or spurs receive the initial pressure of the journal when in use, and by the rolling action of the same and the load-pressure upon the bearing are caused to yield and be crushed down and spread in conformity with the contour of the journal, so that the surface of soft metal first in wearing contact with the journal will automatically adjust and fit itself thereto, while the form of the harder metal of the bearing, which supports the soft-metal part, will not be crushed or changed by reason of the load-pressure. The form of the said ridges or spurs and of the recesses is of little importance, except as a matter of convenience in their formation, and their longitudinal direction may differ very widely from that of the journal to which the bearing is applied without practically impairing the value for the purposes for which they are employed, provided the metal forming the ridges or spurs is of a soft or yielding nature and is applied to the hard or unyielding portion of the journal-bearing as herein set forth.

The ridges of soft metal may be intercepted by transverse ridges or stops *e*, for limiting the flow of the lubricant toward either end of the grooves in which it is placed.

The hard or unyielding body or portion of the journal-bearing which carries the ridges of soft or yielding metal upon its journal side is seated in an iron casing or housing, B, as illustrated in Figs. 1 and 3.

Having thus described my invention, what I claim is—

1. A journal-bearing made of two different metals, one of a soft or yielding nature and the other of a hard or unyielding nature, the soft or yielding carrying ridges or spurs which receive the initial pressure of the journal and by the rolling action of the same and the load-pressure upon the bearing become crushed down and spread in conformity with the contour thereof, as described, whereby the surfaces in wearing contact are adjusted to each other, substantially as specified.

2. A journal-bearing adapted to conform to the contour of the journal in connection with which it is used by having on its journal side ridges or projections made of a metal of a soft or yielding nature, which ridges or projections receive the initial contact of the journal and by the revolution thereof and the load-pressure upon the bearing become crushed down and spread, substantially as herein described.

In testimony whereof I have hereunto set my hand before two subscribing witnesses.

DAVID A. HOPKINS.

Witnesses:
CHARLES F. HOPKINS,
JOHN A. KENNY.